(12) United States Patent
Dejanovic et al.

(10) Patent No.: US 11,553,029 B2
(45) Date of Patent: Jan. 10, 2023

(54) METHOD AND APPARATUS FOR HTML CONSTRUCTION USING THE WIDGET PARADIGM

(71) Applicant: SellPoints, Inc., Emeryville, CA (US)

(72) Inventors: Ivan Dejanovic, Emeryville, CA (US); Benjamin Blum, Emeryville, CA (US)

(73) Assignee: SYNDIGO LLC, Chicago, IL (US)

( * ) Notice: Subject to any disclaimer, the term of this patent is extended or adjusted under 35 U.S.C. 154(b) by 0 days.

(21) Appl. No.: 16/396,130

(22) Filed: Apr. 26, 2019

(65) Prior Publication Data

US 2019/0332643 A1 Oct. 31, 2019

Related U.S. Application Data

(60) Provisional application No. 62/663,795, filed on Apr. 27, 2018, provisional application No. 62/663,850, (Continued)

(51) Int. Cl.
| | | |
|---|---|---|
| *G06F 17/00* | (2019.01) | |
| *H04L 67/02* | (2022.01) | |
| *G06F 16/958* | (2019.01) | |
| *G06F 16/955* | (2019.01) | |
| *G06F 8/38* | (2018.01) | |
| *G06F 40/12* | (2020.01) | |
| *G06F 40/106* | (2020.01) | |
| *G06F 40/143* | (2020.01) | |
| *H04L 67/53* | (2022.01) | |
| *H04L 67/50* | (2022.01) | |

(52) U.S. Cl.
CPC ............. *H04L 67/02* (2013.01); *G06F 8/38* (2013.01); *G06F 16/958* (2019.01); *G06F 16/9566* (2019.01); *G06F 16/986* (2019.01); *G06F 40/106* (2020.01); *G06F 40/12* (2020.01); *G06F 40/143* (2020.01); *H04L 67/53* (2022.05); *H04L 67/535* (2022.05)

(58) Field of Classification Search
CPC ...... G06F 40/14; G06F 16/958; G06F 16/986; G06F 16/9566; G06F 40/12; G06F 40/106; G06F 8/38; G06F 16/00; G06F 40/143; H04L 67/02; H04L 67/20; H04L 67/22; H04L 67/53; H04L 67/535
USPC ........................................................ 715/235
See application file for complete search history.

(56) References Cited

U.S. PATENT DOCUMENTS

| | | | |
|---|---|---|---|
| 7,024,633 B1 * | 4/2006 | Mann ........................ | G06F 8/34 715/744 |
| 8,745,027 B1 | 6/2014 | Haustein | |
| (Continued) | | | |

*Primary Examiner* — Jason T Edwards
(74) *Attorney, Agent, or Firm* — Nixon Peabody LLP

(57) ABSTRACT

A method and apparatus for building and delivering a HTML (Hypertext Markup Language) construction representing digital content layout are disclosed herein. In one embodiment, the method includes constructing the digital content layout by selecting a delivery method, selecting subwidgets, and using the selected subwidgets to build and represent the digital content layout, wherein the delivery method is an inline, and wherein the subwidgets include images, texts, or videos. The method also includes integrating the digital content layout with a designated website. The method further includes delivering third-party content to the designated website. In addition, the method includes tracking interactive content on the designated website.

17 Claims, 27 Drawing Sheets

Related U.S. Application Data filed on Apr. 27, 2018, provisional application No. 62/663,822, filed on Apr. 27, 2018, provisional application No. 62/663,870, filed on Apr. 27, 2018.

(56) References Cited

U.S. PATENT DOCUMENTS

| | | | |
|---|---|---|---|
| 9,621,428 B1 | 4/2017 | Lev | |
| 10,534,851 B1 * | 1/2020 | Chan | G06Q 30/0255 |
| 2007/0061704 A1 | 3/2007 | Simova | |
| 2007/0078963 A1 | 4/2007 | Woodard | |
| 2008/0294998 A1 * | 11/2008 | Pyhalammi | G06F 9/451 |
| | | | 715/748 |
| 2009/0172551 A1 * | 7/2009 | Kane | G06Q 30/02 |
| | | | 715/733 |
| 2009/0288021 A1 * | 11/2009 | Ioffe | H04L 67/34 |
| | | | 715/760 |
| 2011/0154200 A1 * | 6/2011 | Davis | H04N 21/235 |
| | | | 715/765 |
| 2011/0191316 A1 * | 8/2011 | Lai | G06F 7/10 |
| | | | 707/706 |
| 2011/0289065 A1 * | 11/2011 | Wells | G06F 16/9577 |
| | | | 707/706 |
| 2013/0031082 A1 | 1/2013 | Wolfram | |
| 2013/0198609 A1 * | 8/2013 | Mokhtarzada | G06F 3/0481 |
| | | | 715/234 |
| 2014/0258972 A1 | 9/2014 | Savage | |
| 2015/0128162 A1 | 5/2015 | Ionescu | |
| 2016/0283460 A1 * | 9/2016 | Weald | H04L 67/42 |
| 2017/0031907 A1 | 2/2017 | Juang | |
| 2017/0046531 A1 | 2/2017 | Roberts | |
| 2017/0243280 A1 * | 8/2017 | Robb | G06Q 30/0643 |
| 2019/0138162 A1 | 5/2019 | Zverina | |

* cited by examiner

▼ Query String Parameters    view source    view URL encoded
    u: 8D57AA6A-CD92-4777-A6F1-AA47676DD8CE
    prtnid: 83
    pageid: 100355896
    s: 1522815012733
    v: v0.3.937
    visitid: 10712020-A8F3-41CE-B77B-F643DE78556D
    z: 2
    clickcount: 2
    cwh: Voebp0lY
    cwv: 3
    cwt: widget/image/image
    wh: 0YZ8rEnY
    wv: 3
    wt: widget/12/12
    a: open
    ref: https://www.costco.com/
    r: 0.7256924009441487

FIG. 23

▼ Query String Parameters    view source    view URL encoded
  u: 8D57AA6A-CD92-4777-A6F1-AA47676D08CE
  prtnid: 83
  pageid: 100355896
  s: 1522815012733
  v: v0.3.937
  visitid: 10712020-A8F3-41CE-B77B-F643DE7B5560
  z: 2
  clickcount: 2
  cwv: 3
  cwt: widget/image/image
  wh: 0YZBrEnY
  wv: 3
  wt: widget/12/12
  a: open
  dt: 32.366
  ref: https://www.costco.com/
  r: 0.7256924889441487

FIG. 24

METHOD AND APPARATUS FOR HTML CONSTRUCTION USING THE WIDGET PARADIGM

CROSS-REFERENCE TO RELATED APPLICATIONS

The present Applications claims the benefit of U.S. Provisional Patent Application Ser. Nos. 62/663,795, 62/663,822, 62/663,850, and 62/663,870 filed on Apr. 27, 2018, the entire disclosures of which are incorporated herein in its entirety by reference.

FIELD OF THE INVENTION

The embodiments of the invention generally relate to a method and apparatus for HTML construction using the widget paradigm.

BACKGROUND

Constructing complex and interactive web pages is difficult and requires web design and web development skills. There is generally a need for a framework for constructing HTML in a scalable and repeatable way using existing or pre-built building blocks.

SUMMARY

A method and apparatus for building and delivering a HTML (Hypertext Markup Language) construction representing digital content layout are disclosed herein. In one embodiment, the method includes constructing the digital content layout by selecting a delivery method, selecting subwidgets, and using the selected subwidgets to build and represent the digital content layout, wherein the delivery method is an inline, and wherein the subwidgets include images, texts, or videos. The method also includes integrating the digital content layout with a designated website. The method further includes delivering third-party content to the designated website. In addition, the method includes tracking interactive content on the designated website.

BRIEF DESCRIPTION OF THE DRAWINGS

FIG. 12 shows the exemplary HTML output for the display image shown in FIG. 11 in accordance with one embodiment of the invention.

FIG. 13 shows exemplary HTML source code of a web page where a unique page identifier is displayed in accordance with one embodiment of the invention.

FIGS. 16A and 16B illustrate exemplary web pages with overlay in accordance with one embodiment of the invention.

FIG. 18 shows an exemplary JSON (JavaScript Object Notation) for a web page in accordance with one embodiment of the invention.

FIG. 19 illustrates an example of a first widget JSON map being delivered to a web page in accordance with one embodiment of the invention.

FIG. 20 shows an example of a second widget JSON map being delivered to a web page in accordance with one embodiment of the invention.

FIG. 21 shows an example of multiple CSS files being streamed to the web page in accordance with one embodiment of the invention.

FIG. 22 shows exemplary identifiers in accordance with one embodiment of the invention.

FIG. 23 shows exemplary classifiers in accordance with one embodiment of the invention.

FIG. 24 illustrates exemplary values in accordance with one embodiment of the invention.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

In the context of a networked environment, general reference will also be made to real-time communication between a "source" device and a "destination" device. The term device includes any type of computing apparatus, such as a PC, laptop, handheld device, or server that is capable of sending and receiving messages over a network according to a standard network protocol. Source computing devices refer to the device that initiates the communication, or that first composes and sends a message, while destination computing devices refer to the device that receives the message. Those skilled in the art will recognize that the operation of the source computing device and destination computing device are interchangeable. Thus, a destination computing device may at some point during a session act as a sender of messages, and a source computing device can at times act as the recipient of messages. For this reason, the systems and methods of the invention may be embodied in traditional source computing devices as well as destination computing devices, regardless of their respective hardware, software or network configurations. Indeed, the systems and methods of the invention may be practiced in a variety of environments that require or desire the performance enhancements provided by the invention. These enhancements are set forth in greater detail in subsequent paragraphs.

Figure 1:
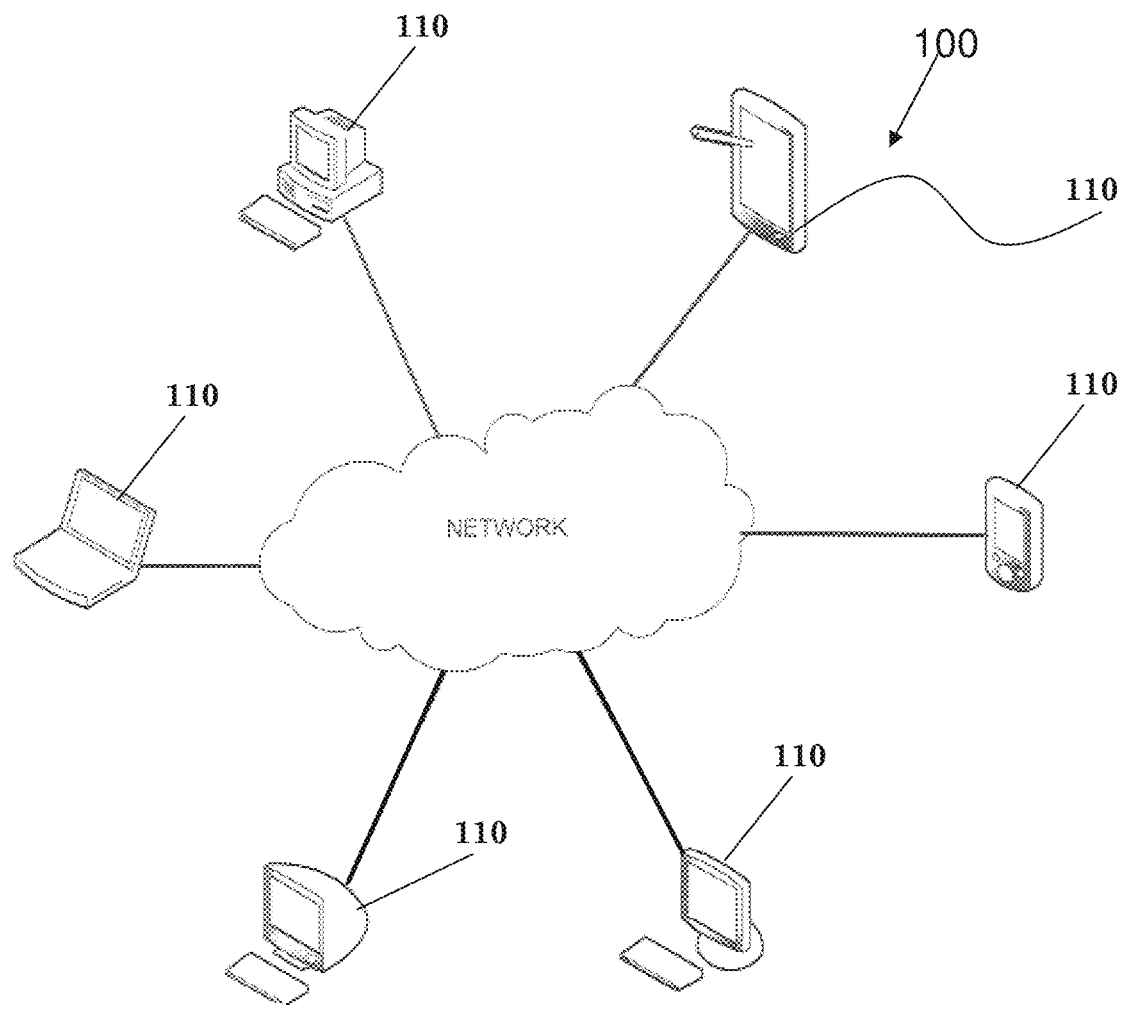
FIG. 1 shows an exemplary network in which one embodiment of the invention may be implemented.

FIG. 1 shows an exemplary network 100 in which one embodiment of the invention may be implemented. The exemplary network 100 includes several computing devices 110 communicating with one another over a network 120, such as the Internet, as represented by a cloud. Network 120 may include many well-known components (such as routers, gateways, hubs, etc.) to allow the computing devices 110 to communicate via wired and/or wireless media.

Figure 2:
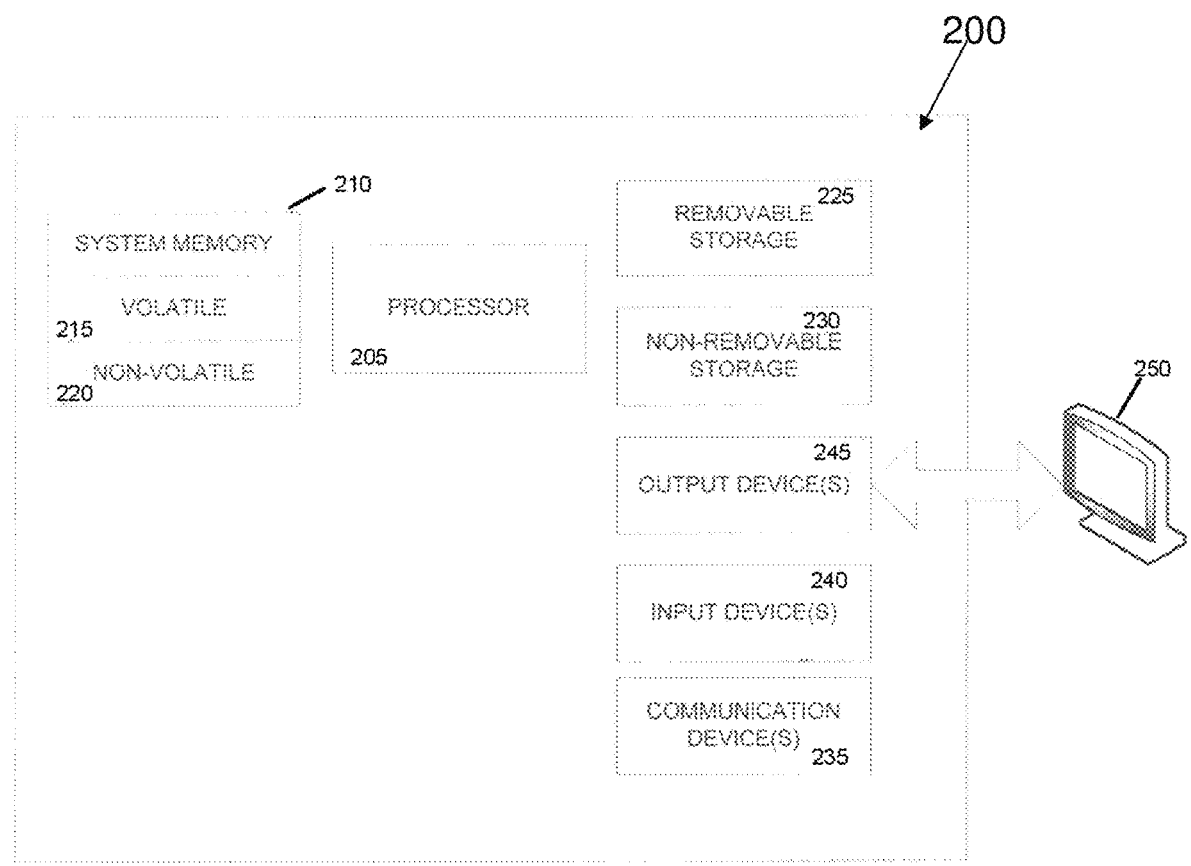
FIG. 2 illustrates an example of a basic configuration for a computing device on which one embodiment of the invention may be implemented.

FIG. 2 illustrates an example of a basic configuration for a computing device 200 on which one embodiment of the invention may be implemented. Computing device 200 typically includes at least one processing unit 205 and memory 210. Depending on the exact configuration and type of the computing device 200, the memory 210 may be volatile (such as RAM) 215, non-volatile (such as ROM or flash memory) 220 or some combination of the two. Additionally, computing device 200 may also have additional features/functionality. For example, computing device 200 may also include additional storage (removable 225 and/or non-removable 230) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by computing device 200. Any such computer storage media may be part of computing device 200.

Computing device 200 may also contain one or more communication devices 235 that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computing device 200 may also have one or more input devices 240 such as a keyboard, mouse, pen, voice input device, touch input device, etc. Output devices 240 such as a display 250, speakers, a printer, etc. may also be included. All these devices are well known in the art and need not be discussed at length here.

The process of constructing complex and interactive web pages is difficult and requires web design and web development skills. The widget paradigm simplifies this process, removing the need for design and development skills by programmatically handling all HTML creation and manipulation to deliver HTML content that is responsive, adaptive and accessible.

Figure 3:
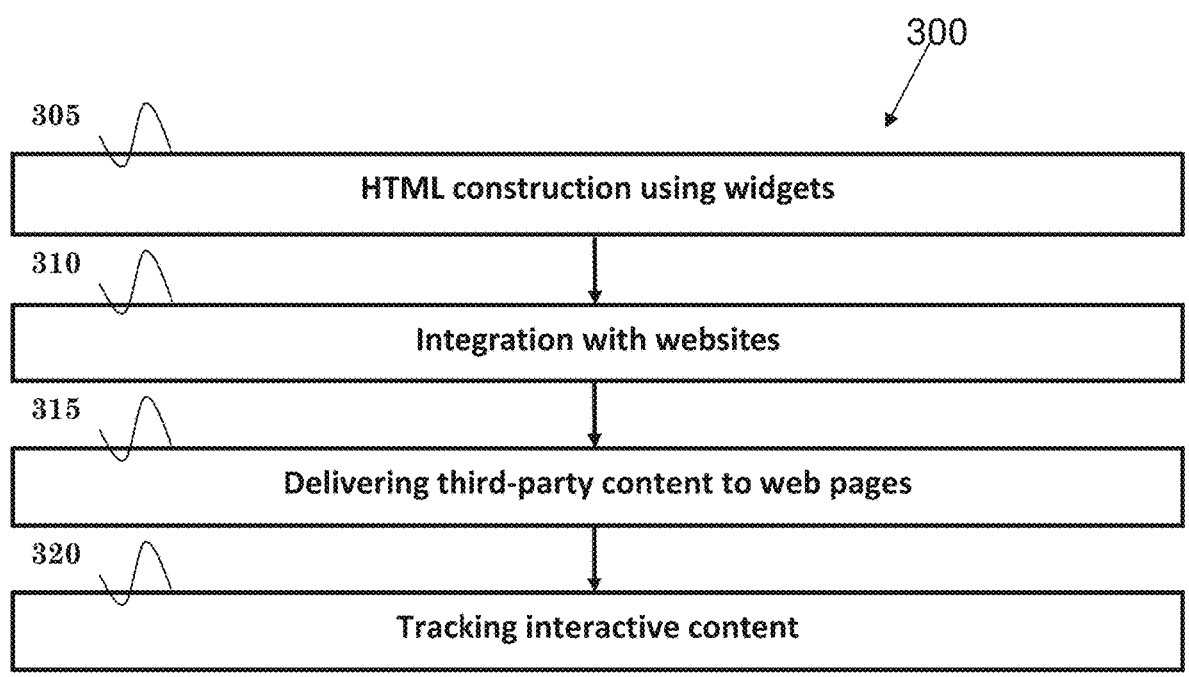
FIG. 3 is a flow chart in accordance with one embodiment of the invention.

FIG. 3 is a block diagram 300 showing the general steps of the widget paradigm in accordance with one embodiment. Block 305 involves HTML construction using the widget paradigm. Block 310 involves integration with web sites. Block 315 involves delivering third-party content to web pages. Block 320 involves tracking interactive content.

I. HTML Construction Using the Widget Paradigm (Step 305 of FIG. 3)

In general, pages and interactive content constructed in the inventive system utilize the widget paradigm which is a general framework for constructing HTML in a scalable and repeatable way using building blocks or widgets. The widget paradigm generally consists of various widgets which can be seamlessly built into and on top of one another to create a variety of page layouts and experiences. In one embodiment, the building blocks of the widget paradigm could include:
Method of Delivery/Layout
Players and containers to render assets/media
Assets In one embodiment, there could be three core methods of delivery (referred to as container widgets) because they serve as the layout or container for other widgets which display assets. The core methods of delivery include:
1. Inline—Content rendered directly inline in a webpage.
2. Call To Action (CTA)—A button displayed inline which, when clicked, triggers a modal window with content.
3. Overlay—One or more CTAs rendered on top of an existing element on a webpage.

Figure 4A:
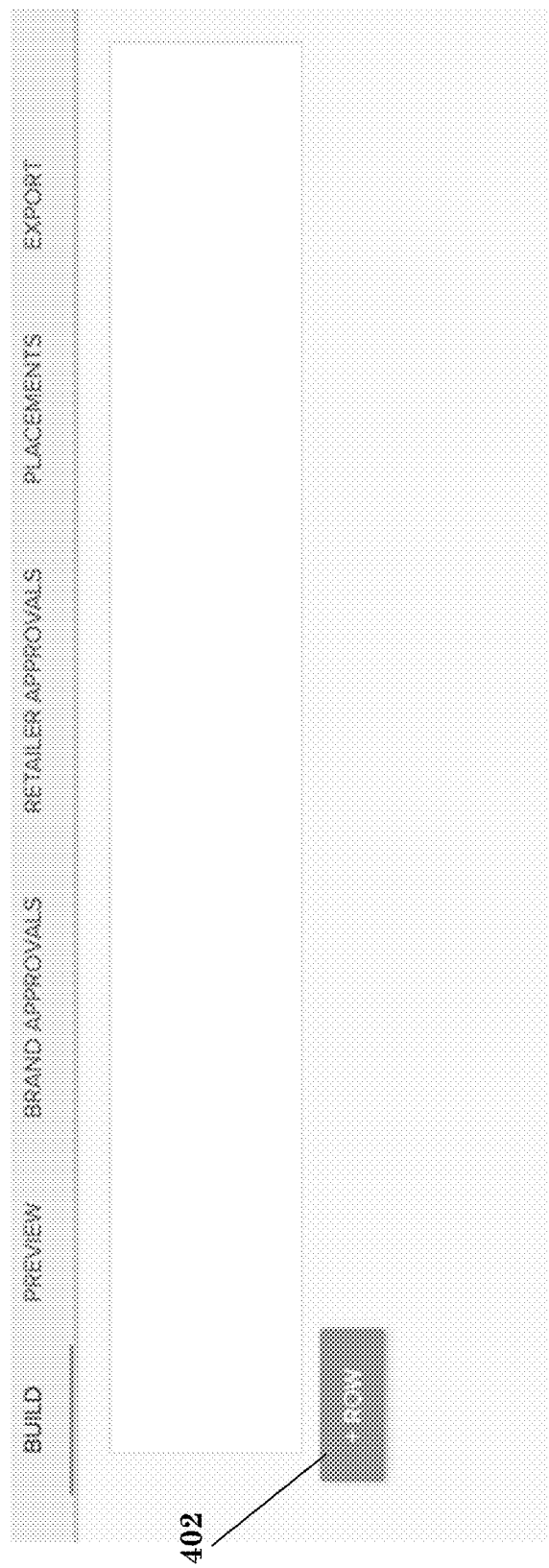
FIG. 4A illustrates a user screen to select a build process in accordance with one embodiment of the invention.
Figure 4B:
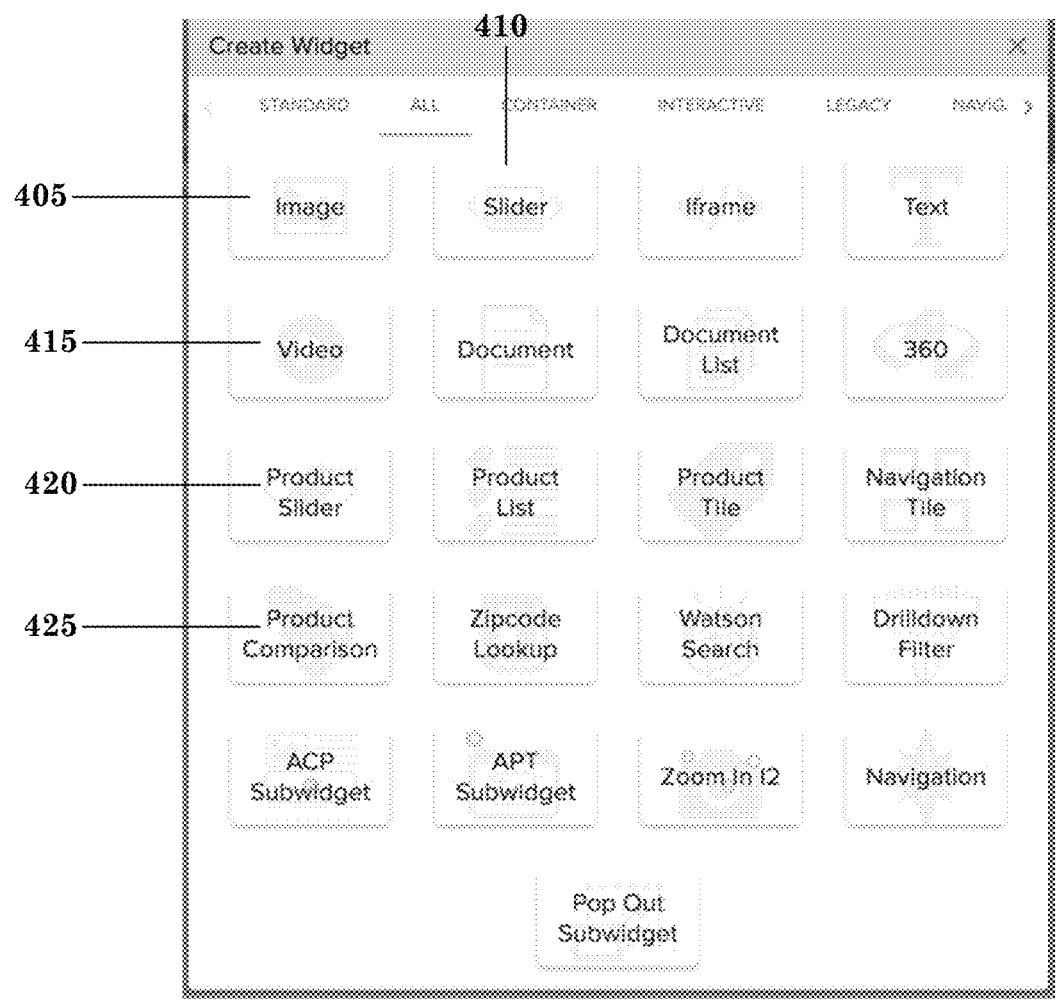
FIG. 4B illustrates an exemplary container widget with several subwidgets in accordance with one embodiment of the invention.

The page or experience creation process begins by selecting the method of delivery or layout. The below example showcases the build process for inline content. Once selected, the user can begin to design the contents of the layout, as shown in FIG. 4A. Selecting the row 402 would trigger the option to select what should go in the row. There are several widget types which are used to house, play, or render assets. These widget types are referred to as subwidgets because they reside within a container widget as shown FIG. 4B. Exemplary subwidgets illustrated in FIG. 4B include Image 405, Slider 410, Video 415, Product Slider 420, Product Comparison 425, etc.

In one embodiment, there could be two different kinds of subwidgets, including: asset subwidgets and container subwidgets. Asset Subwidgets are directly associated with media, data, or a URL to render content. Container subwidgets include image containers, text or HTML containers, video players, document viewers, etc. The subwidgets handle the HTML construction and properties in order to render the assets or media appropriately. Depending on the type of asset subwidget, the contents can be used as the canvas for overlay based CTAs.

In one embodiment, container widgets can be rendered within container widgets to make unique and interactive layouts and experiences: inline grid layouts, CTAs, overlays on top of images, etc. For example, the overlay method can be utilized to display CTAs on an image which is within an inline layout, as shown in successive steps illustrated in exemplary FIGS. 5-12.

Figure 5:
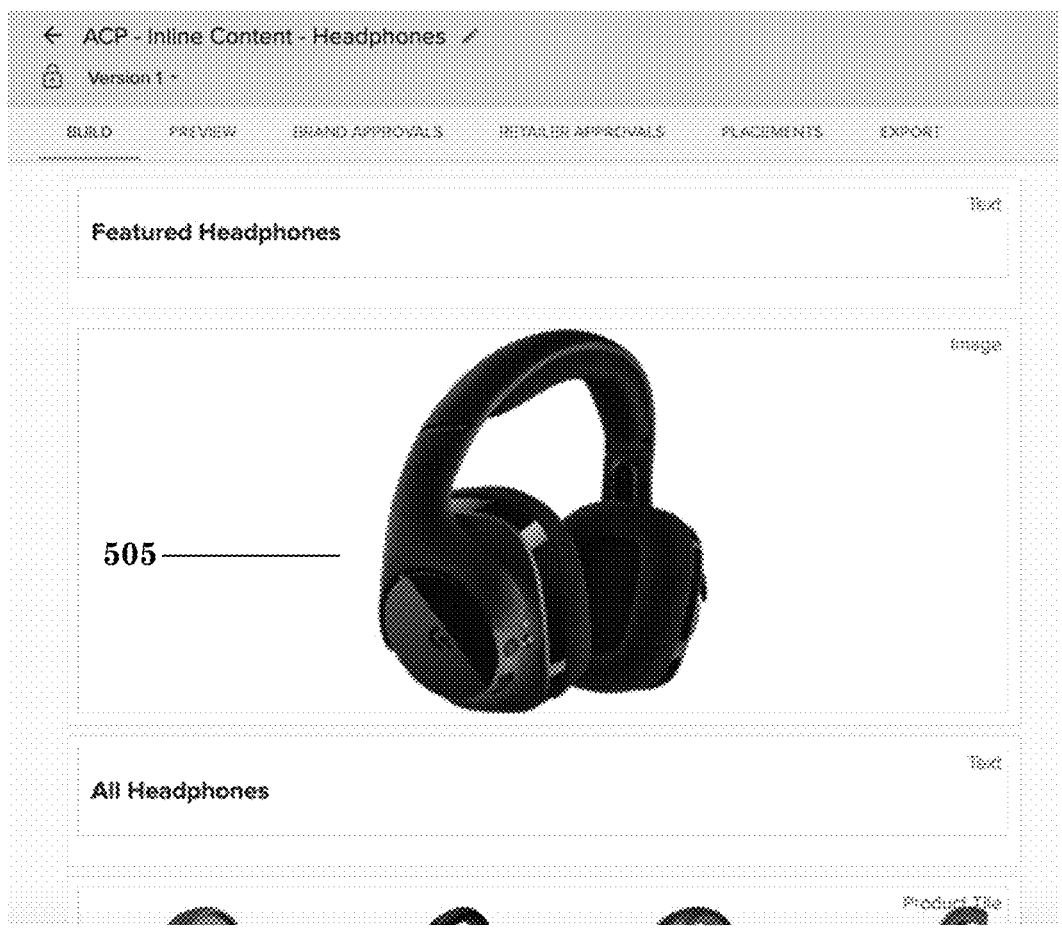
FIGS. 5-11 show exemplary successive steps in building a display experience in accordance with one embodiment of the invention.
Figure 6:
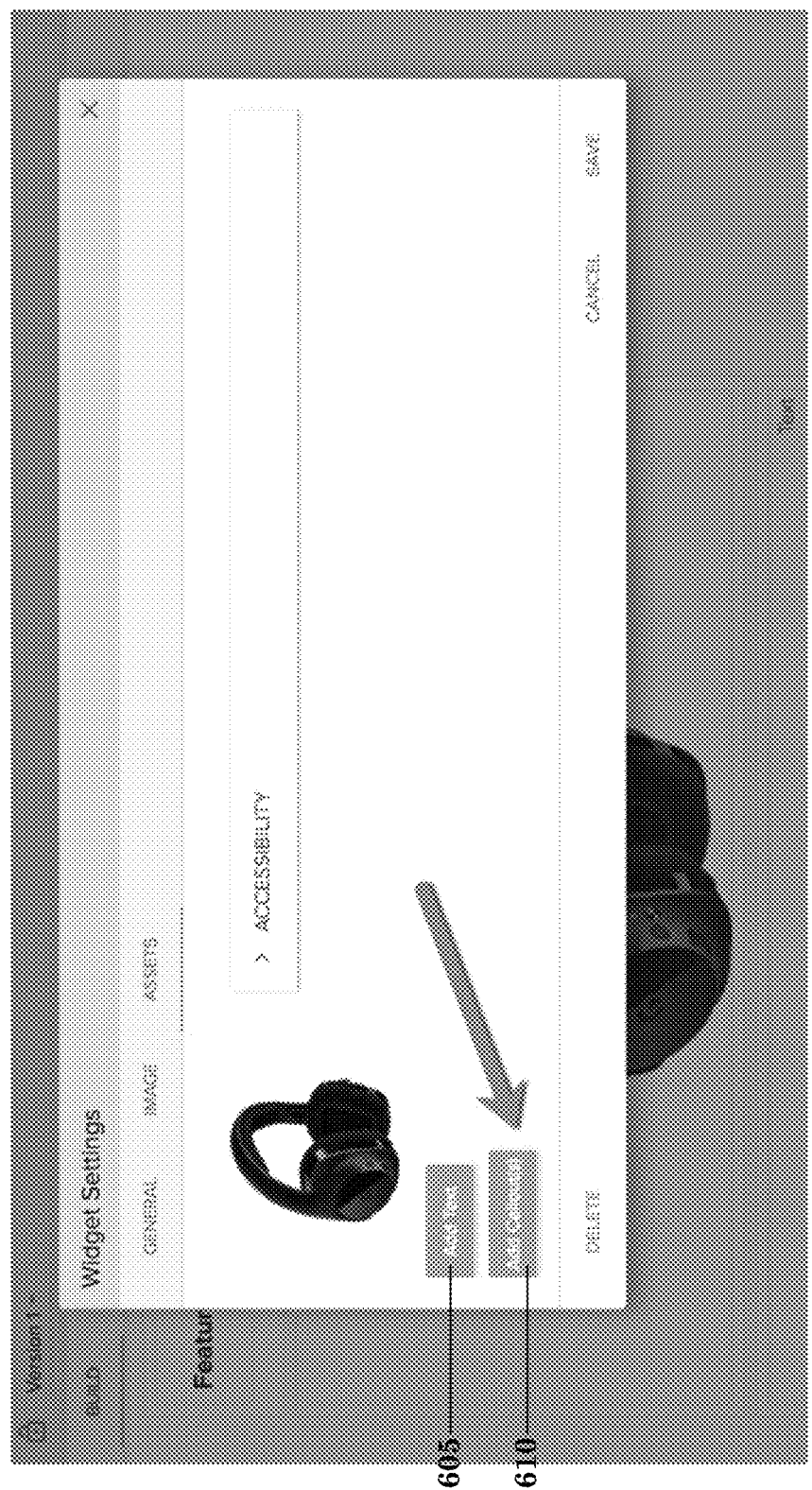
Figure 7:
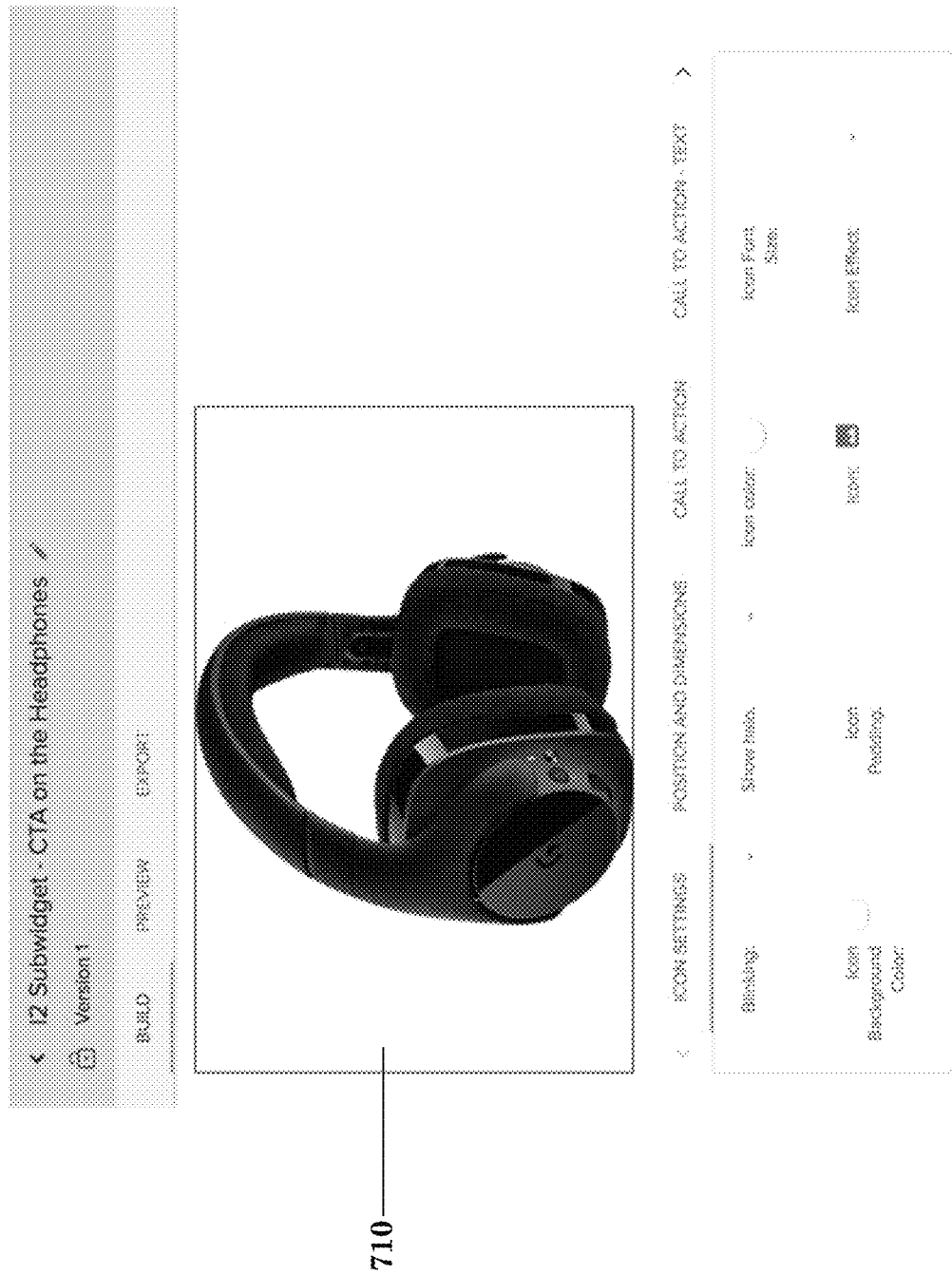
Figure 8:
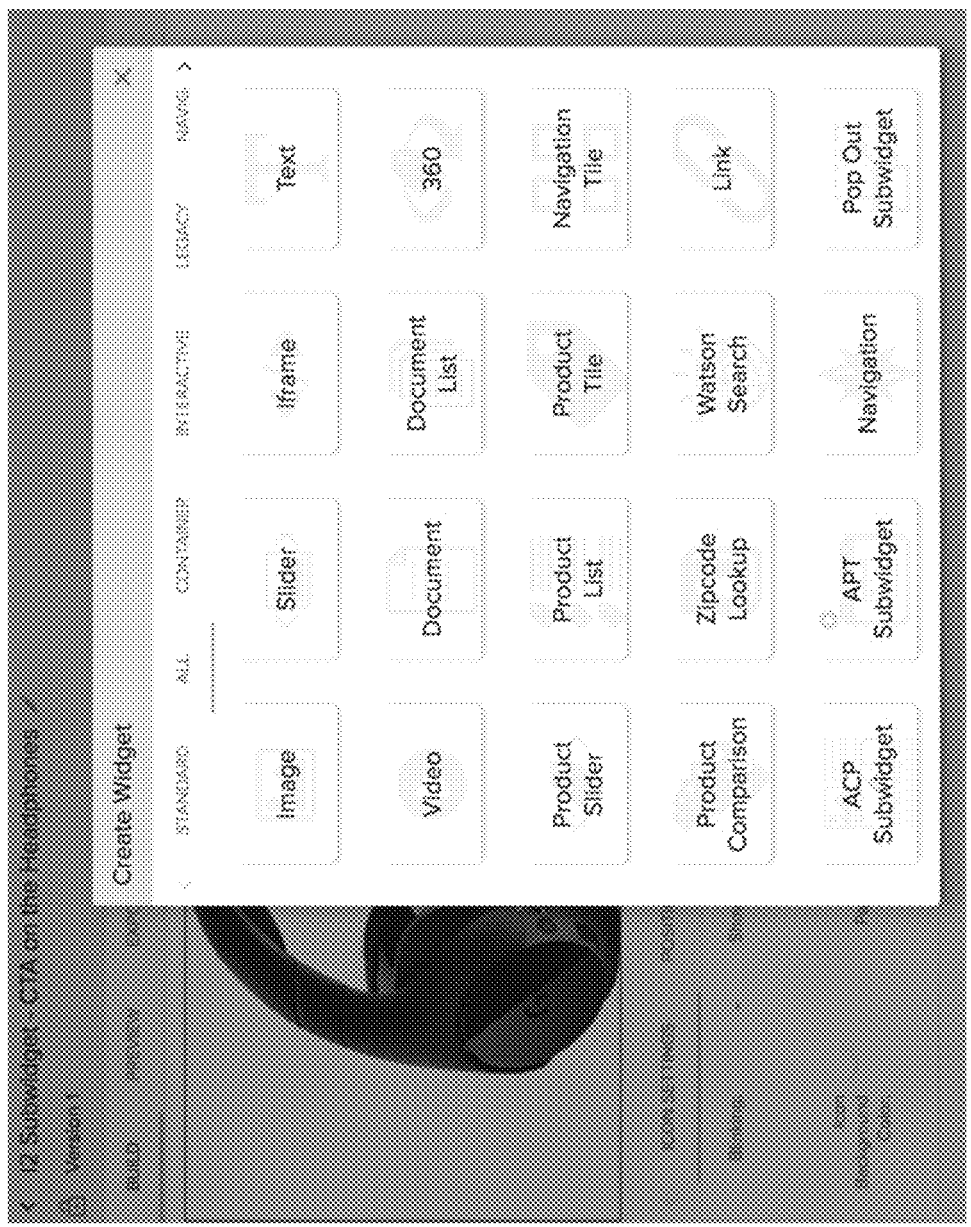
Figure 9:
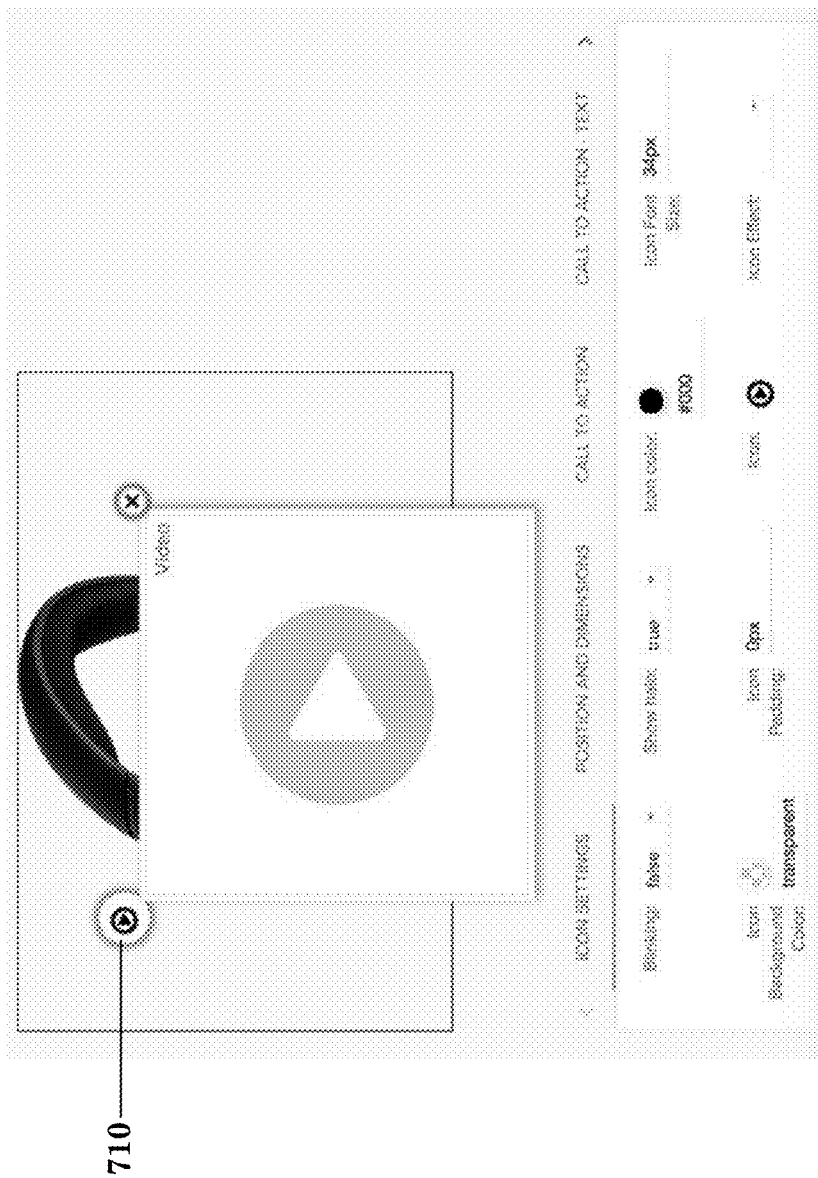
Figure 10:
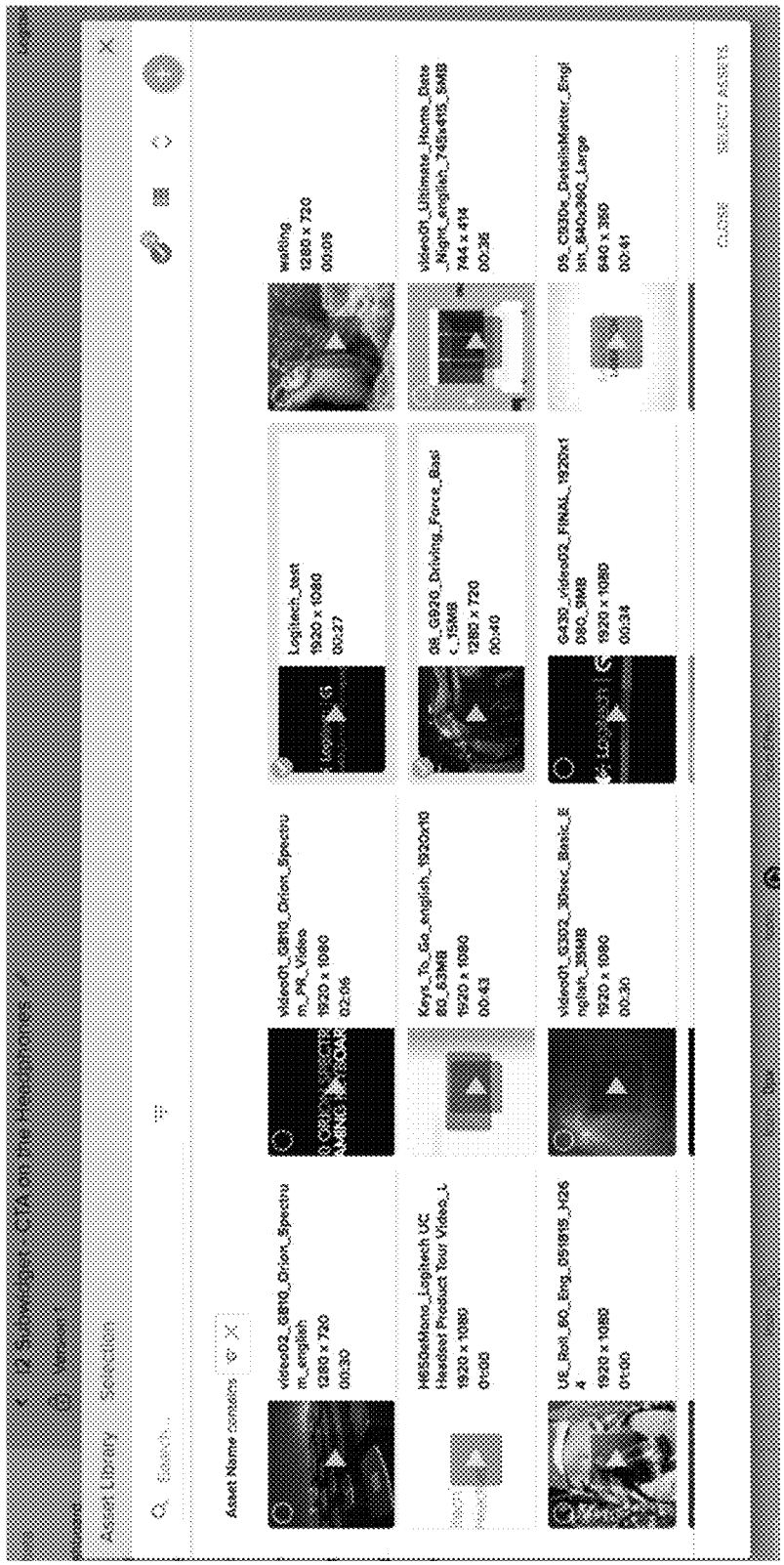
Figure 11:

In particular, FIG. 5 illustrates an exemplary Inline layout that showcases a featured pairs of headphones using an image 505. FIG. 6 illustrates that within the Image widget settings, the user can add an overlay (such as Text 605 or Callout(s) 610 to the image. In FIG. 7, the user is presented with a canvas 710 to place CTAs on the headphones. As shown in the FIG. 8, the user can select from a variety of subwidgets (e.g., shown as elements 405, 410, 415, 420, and 425 in FIG. 4) to show behind the CTA. As illustrated in FIG. 9, after widget selection, the selected module (i.e., a video subwidget 910 in the example shown in FIG. 9) is displayed on the canvas. FIG. 10 shows exemplary asset(s) to be displayed in the widget are selected. As shown in FIG.

11, the entire experience 1100 is rendered, and the CTA is displayed on the Image within the inline display method.

In general, the widget paradigm produces highly structured HTML which is responsive, adaptive, and accessible. FIG. 12 includes the HTML output 1200 for the Featured Headphones image shown in FIG. 11.

Because the HTML is programmatically structured, using the same logical approach for constructing rows, zones, and holders, the content builder can combine various widgets by referencing the appropriate DIV and/or class depending on the desired experience. Once a particular experience is packaged in widget form, the experience becomes part of the widget paradigm.

II. Integration with Websites (Step 310 of FIG. 3)

The process of constructing complex and interactive web pages is difficult and requires web design and web development skills. The widget paradigm simplifies this process, removing the need for design and development skills by programmatically handling all HTML creation and manipulation to deliver HTML content that is responsive, adaptive and accessible.

A. Placing the OmniTag—

In general, OMNI Content Delivery requires integration with a website. Delivering content to a specific webpage requires two unique pieces of information: the website and the webpage.

The website is identified by providing each integrated website with a unique javascript tag (OmniTag) referencing a specific website ID. An exemplary OmniTag template is shown below:

```
<script type="text/javascript">
    (function (se,ll,p,oin,ts) { oin = se.createElement(ll); oin.type =
    'text/java'+ll;
    oin.async = true; oin.src = p + Math.floor(Date.now( ) / 86400000);
    ts = se.getElementsByTagName(ll)[0];
    ts.parentNode.insertBefore(oin,ts); }
    (document,'script','//a.sellpoint.net/c/spid/sp.js?cv='));
</script>
```

In one embodiment, the spid (or specific website ID) above is replaced with a unique number (e.g., 12345) specific to each website integrated with the OMNI service.

Figure 13:
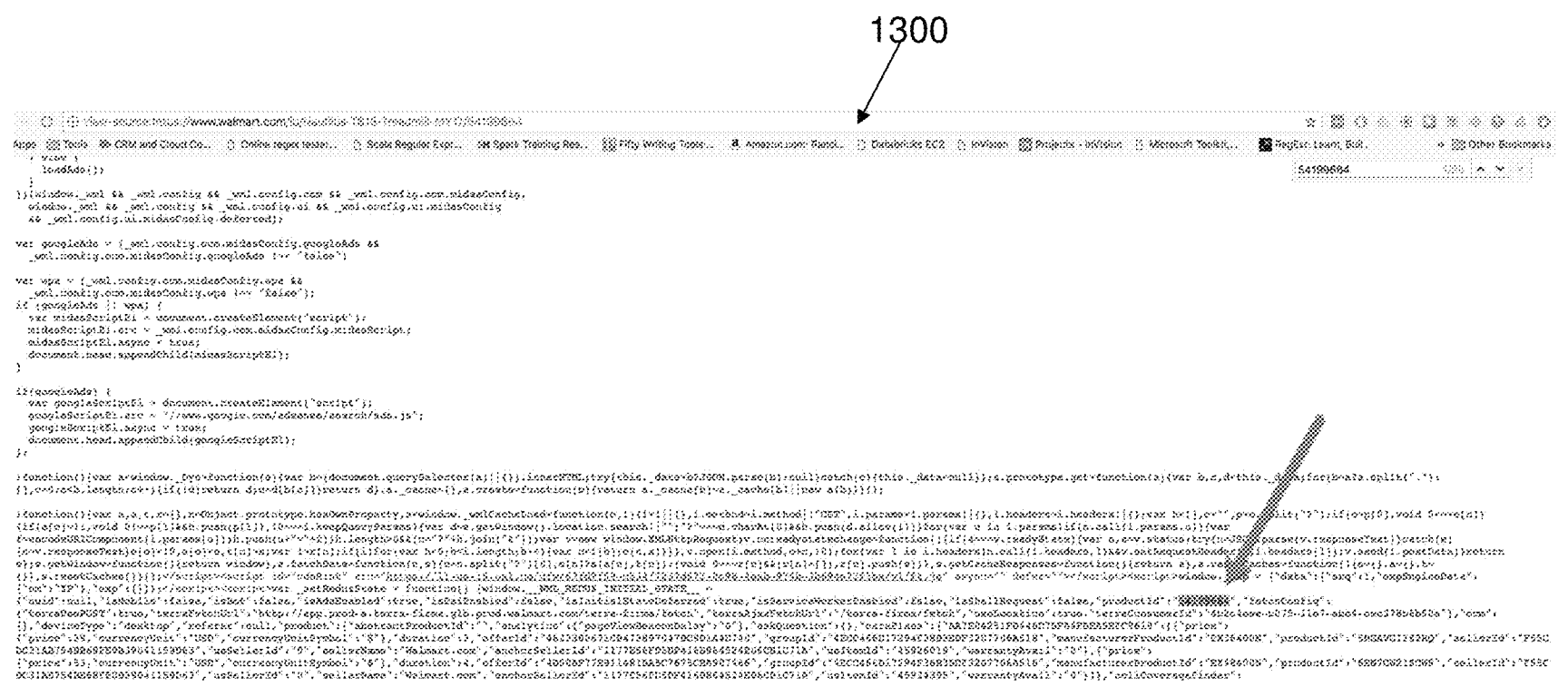

In one embodiment, the web page can be identified through one of four following methods:
1. Referencing the URL path—For example, "ip/Nautilus-T618-Treadmill-MY17/54199664" would be URL path in the example "https://www.walmart.com/ip/Nautilus-T618-Treadmill-MY17/54199664."
2. Referencing a subsection of the URL path—For example, "5419964" would be the relevant subsection of the URL path in https://www.walmart.com/ip/Nautilus-T618-Treadmill-MY17/54199664
3. Identifying an object on the web page which shows a unique page identifier—The screengrab 1300 (shown in FIG. 13) shows an example of an object in the HTML source code of a webpage where the unique page identifier is displayed.
4. Having the webpage "push" the unique page identifier using the following code:

```
<script type="text/javascript">
    var SPWORLD = SPWORLD || [ ]; SPWORLD.push('12345');
</script>
```

In one embodiment, the token "12345" is replaced by the unique page identifier for any given page.

B. Determining where to Place Content—

Figure 14:
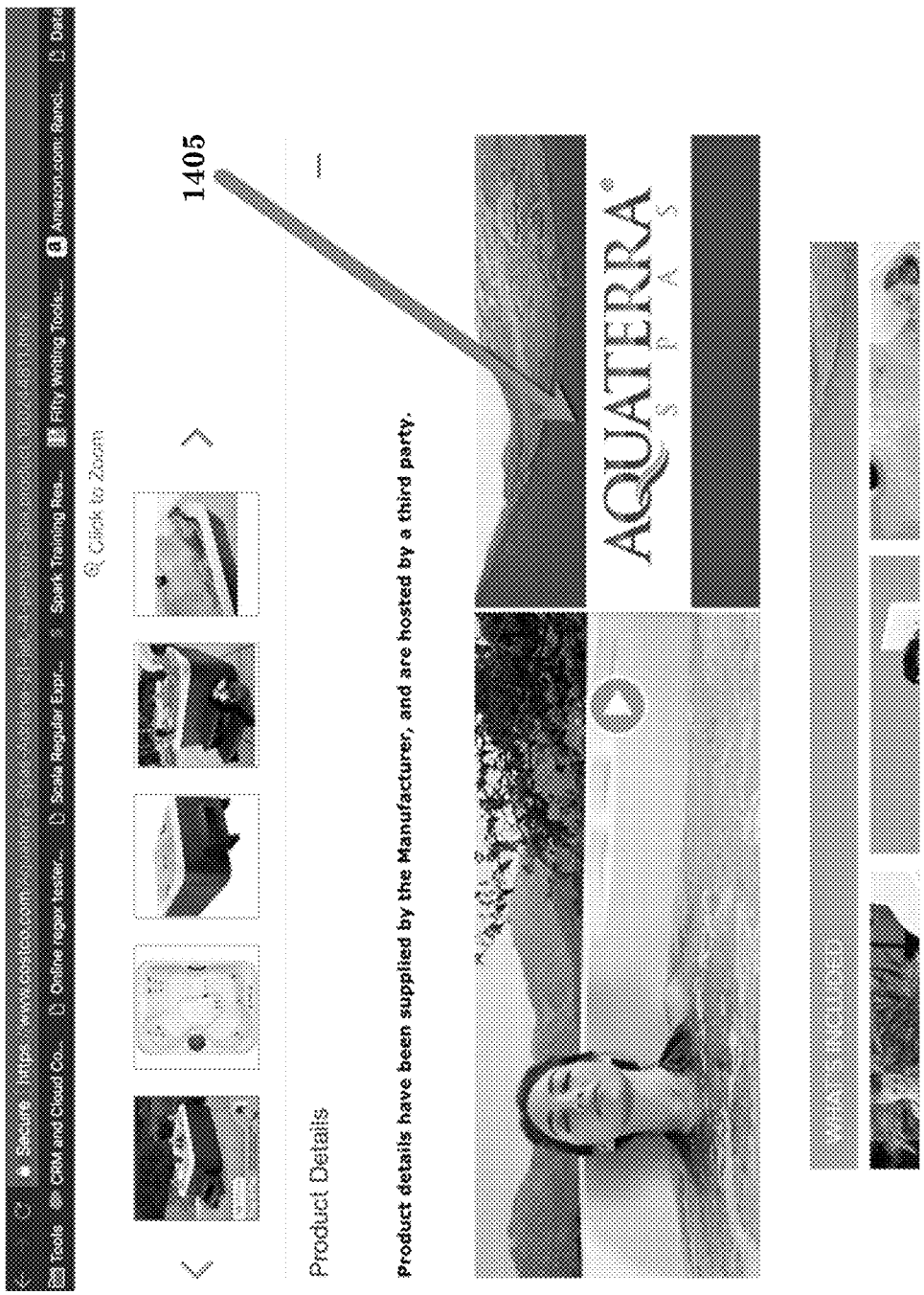
FIG. 14 illustrates an exemplary web page with inline content in accordance with one embodiment of the invention.
Figure 15:
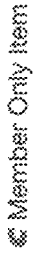
FIG. 15 illustrates an exemplary web page with a "call to action" in accordance with one embodiment of the invention.
Figure 16A:
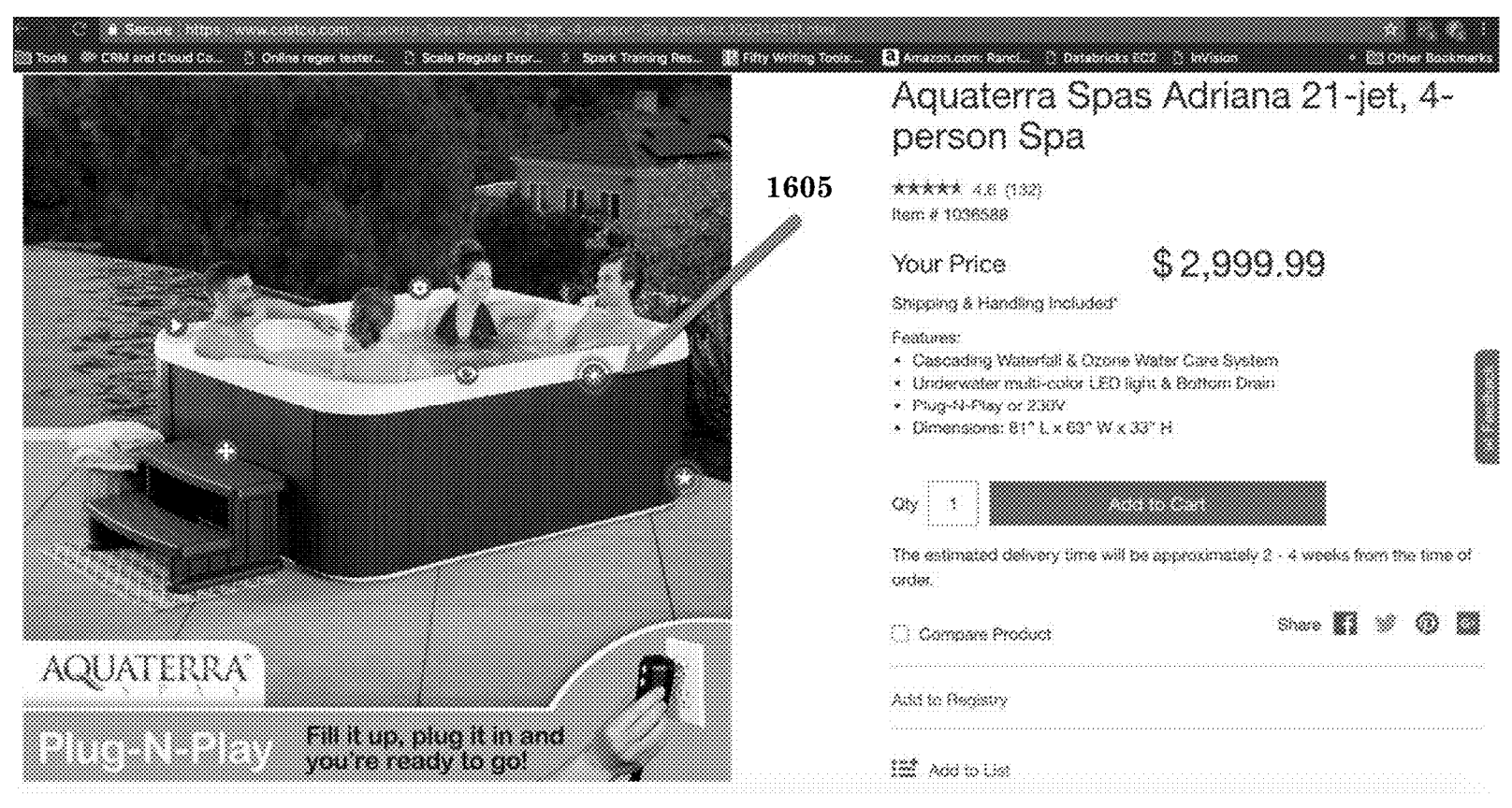
Figure 16B:
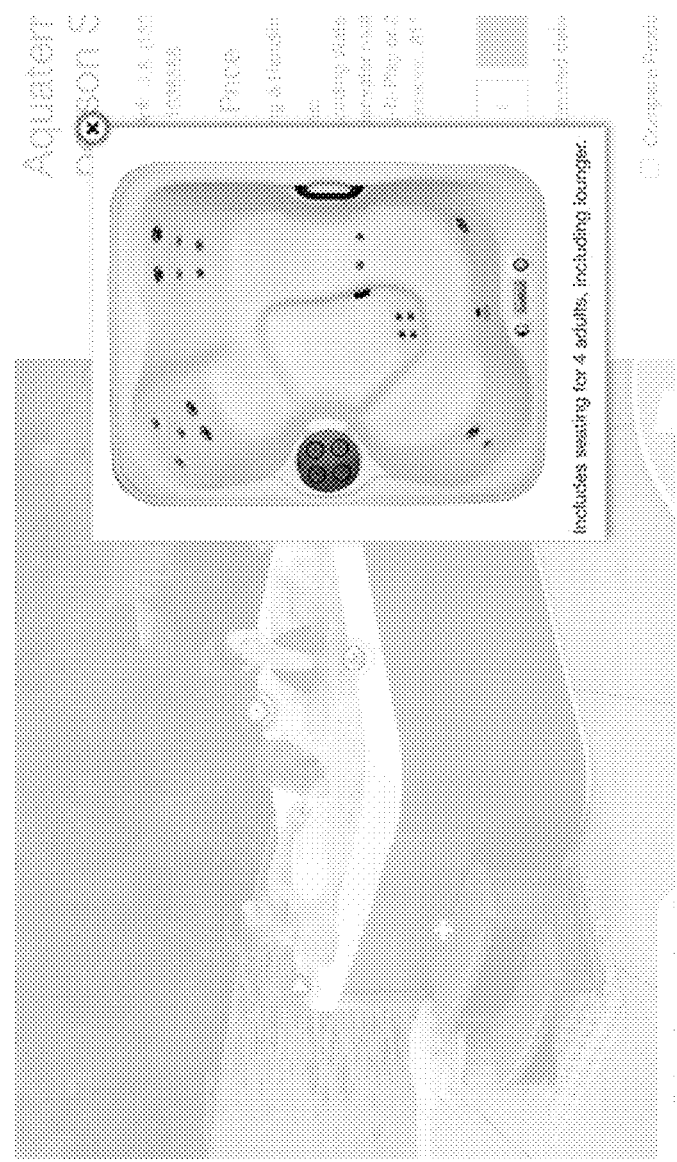

In one embodiment, there could be of delivering content to a webpage:
1. Inline—Content 1405 renders natively in the page as though it is part of the webpage as shown in exemplary FIG. 14.
2. Call To Action (CTA)—A button 1505 is rendered on the page which, when clicked, displays the desired experience, as illustrated in exemplary FIG. 15.
3. Overlay—One or more CTAs are overlaid on images creating an interactive effect, as shown in FIGS. 16A and 16B.

In one embodiment, to control exactly where inline or CTA content renders on the page, the integrator can place the relevant <div> tags found below within their page(s). The OMNI service will immediately recognize these DIVs and deliver content in the appropriate location.

An exemplary <div> tag for inline content (or inline type) could be:
<div id="sp_inline"></div>
An exemplary <div> tag for a "call to action" could be:
<div id="sp_cta"></div>

In one embodiment, a CTA is generally a "button" which triggers an overlay, and can be placed anywhere.

The overlay method requires a custom integration which will be addressed below. In one embodiment, if the integrator cannot support DIV placement on their website, the OmniTag can also be configured to dynamically inject the required <div> tags.

C. Overlay Method—

Overlay content requires a unique integration method because the target location, an element on a web page, can change or be replaced due to responsive or adaptive behaviors. When configured, the overlay delivery method could act as a transparent overlay of an existing image enabling placement of one or more CTA icons or buttons on top of the element to make it interactive.

Figure 17:
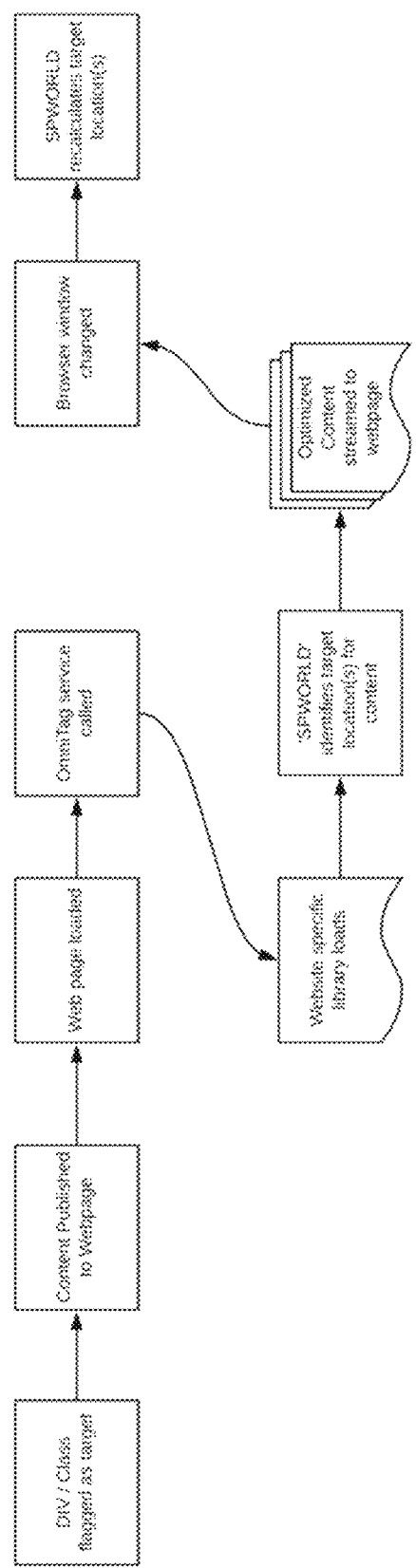
FIG. 17 is a flow chart that generally outlines the operation of an overlay method in accordance with one embodiment of the invention.

FIG. 17 is an exemplary flow chart that illustrates the general processing steps in an overlay method. In order for content delivered via the overlay method to display properly, the HTML DIV/Class of the desired target location must be flagged in OMNI. The process of flagging can either be done manually or by utilizing the OMNI integration application.

In one embodiment, for pages that have been configured to receive content via the overlay method to an element on the page, on page load, SPWORLD (the OMNI javascript framework) calculates the size of the target location and nests the transparent overlay in the absolute position over the element. SPWORLD then requests optimized content from the Content Service based on the resolution and size of the browser to be delivered to the webpage.

Anytime the browser window is adjusted (e.g., rotating a mobile device or tablet from portrait to landscape, or resizing a browser window on a laptop), SPWORLD could recalculate the size of the target DIV/Class and dynamically adjusts the location of CTAs based on the relative position relative to the top left corner of the element.

III. Delivering Third-Party Content to Webpage (Step 320 of FIG. 3)

In general, delivering third party content to a web page presents several problems. Between loading quickly in the right place, appearing native, and minimizing collisions in the code, there are numerous places to go wrong. In one embodiment, OMNI solves the logistical process of delivering third party content to a webpage through a structured sequence of requests and files which ensure the correct, optimized content is delivered. Furthermore, OMNI minimizes the likelihood of collisions in JavaScript and CSS by limiting the introduction of global variables and utilizing highly specific CSS selectors.

A. The Service Request and Structured Response—

Figure 18:
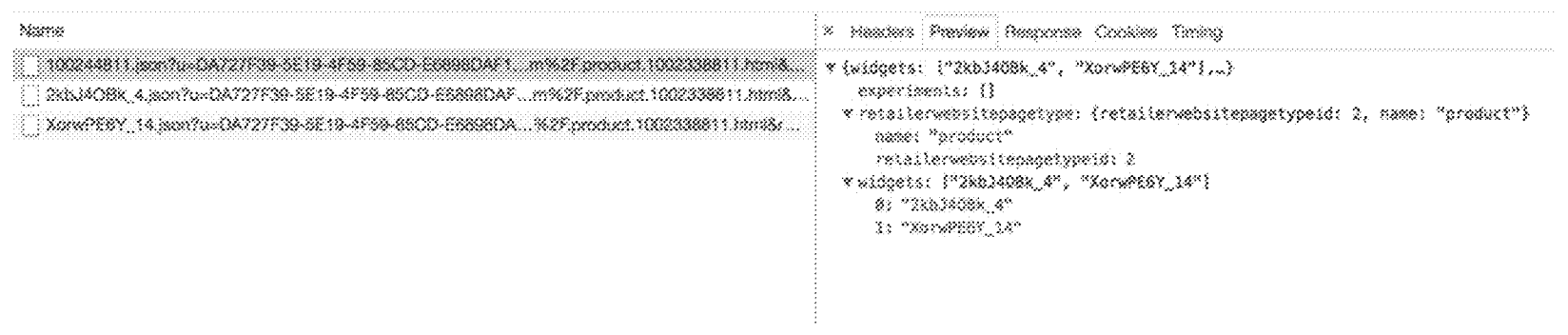

When a page is loaded on a website which has integrated with the OMNI service, a request is made. In one embodiment, OMNI maintains a single JSON (JavaScript Object Notation) file for each web page which houses a map for all content published to the webpage. Upon the initial request, the response is to stream the JSON map to the browser. FIG. 18 shows an exemplary JSON for a web page.

Figure 19:
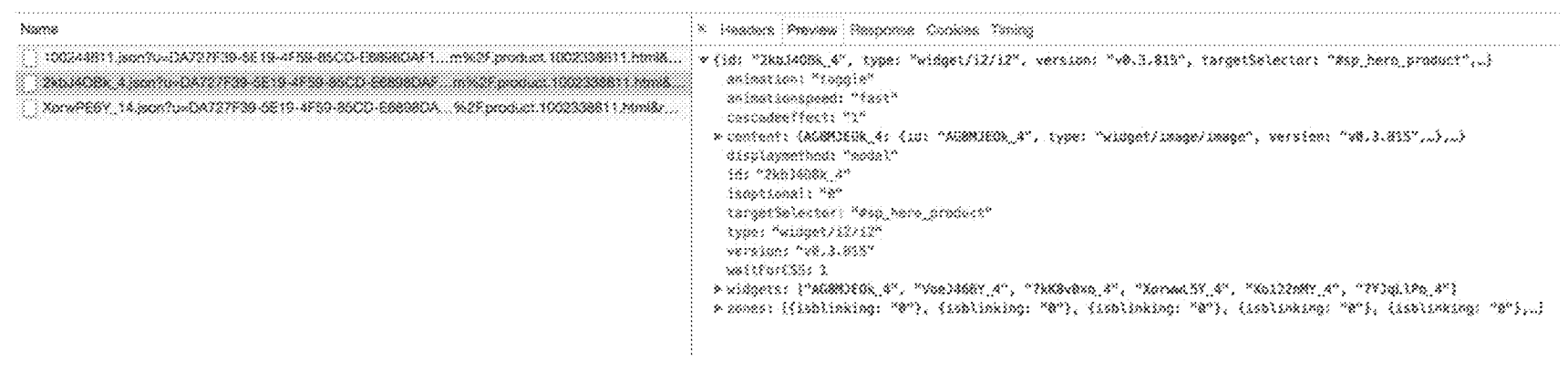
Figure 20:
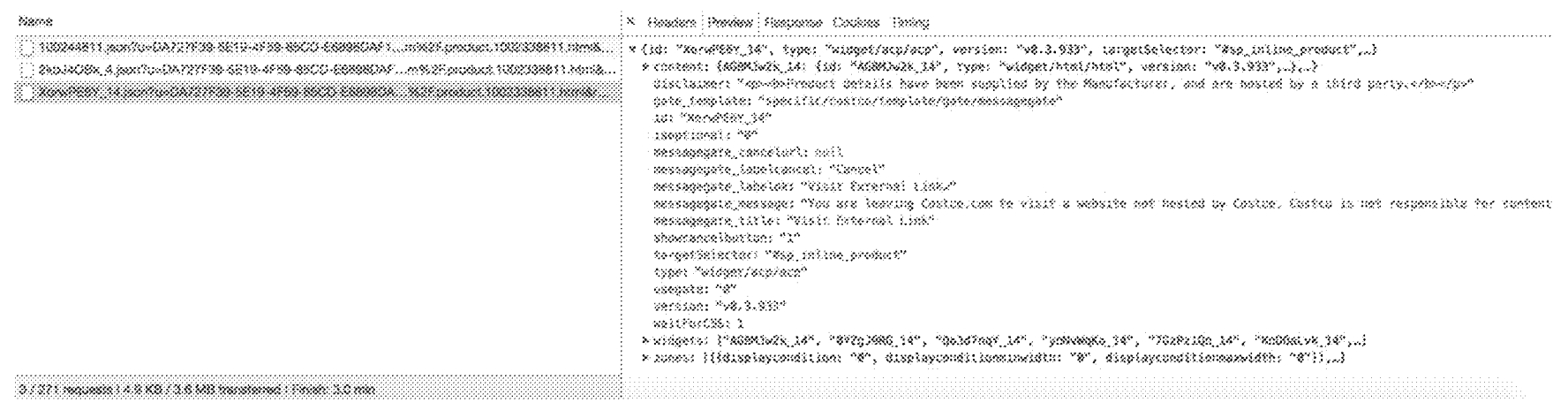

In one embodiment, OMNI also maintains a single JSON file for each widget built in the Content Builder which houses a map of the structure and all assets required to render the content. Following the initial JSON map, a specific widget map for each published experience is streamed to the browser. FIG. 19 illustrates an example of a first widget JSON map being delivered to a web page. FIG. 20 shows an example of a second widget JSON map being delivered to a web page.

B. Making it Look Right—

Figure 21:
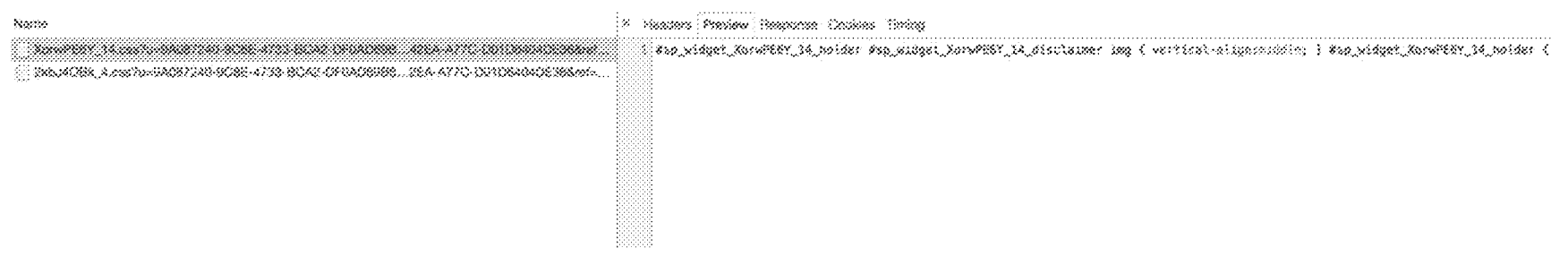

HTML requires CSS to format content. Following the JSON maps, OMNI delivers all required CSS for the content to look native and render appropriately. CSS is defined at the website level but can also be customized on a per widget basis. FIG. 21 shows an example of multiple CSS files being streamed to the web page.

C. Loading Content—

Once the structure is defined and styling applied, widgets request all relevant assets to be streamed to the browser. SPWORLD, the OMNI javascript framework, calculates the size of the browser and requests assets optimized for the available space. Assets are placed into structured HTML which is constructed in real time based on the content of the JSON files.

IV. Tracking Interactive Content (Step 320 of FIG. 3)

In general, content rendered by a third party on a webpage is unique in that interactions with the content are not trackable by the owner of the webpage. As a result, in order to capture data and provide analytics regarding content interactions, OMNI has a proprietary event based tracking system to create relevant and meaningful data to be analyzed. The tracking system consists of several trackers, each of which captures a variety of events.

All event trackers are built on a common tracking framework. As a result, share common attributes such as user IDs, session IDs, and visit IDs. Some event trackers are used for basic web analytics such as the pageview and transaction trackers. However, one of the event trackers, the Action tracker, captures data which is unique to the OMNI ecosystem.

In one embodiment, the Action tracker could be designed to capture events specific to any interaction with content created and delivered by OMNI. Examples of content can be interactive callouts, videos, 360s, documents, etc. Interactions with content could include:

Content loads
Clicks on/interactions with content
Navigation through content
Open and closing of CTAs/callouts In one embodiment, the Action tracker includes an organizational structure and classification mechanisms which connect disparate data to makes sense out of an event. There are three parts to the Action tracker:

1. Identifiers
2. Classifiers
3. Values

In general, identifiers flag what content has loaded, in what context, on which page. For example, a unique set of identifiers can differentiate the same video being loaded via different display methods (inline, as a modal, or behind a callout). Identifiers could include:

Widget types
Widget hash
Version
Website ID
Page ID

FIG. 22 shows exemplary identifiers. The set of identifiers (shown in FIG. 22) is the minimum information required to map metadata stored in the application database to identify all relevant information about the content involved in the event.

In general, classifiers catalog the event which is being logged—load, open, close, click, play, pause, update, etc. In isolation, the event is meaningless, however, when coupled with the identifiers, the classifier brings context to the event. FIG. 23 shows exemplary classifiers.

Values are generally sub-context to a classifier. When a classifier requires additional context to become actionable, a value is introduced to make clear some aspect of the event. For example, if the event is a "callout click", a value (or "clickcount") can be introduced to clarify the number of clicks which have occurred and add order to the events. FIG. 24 illustrates exemplary values.

Figure 25:
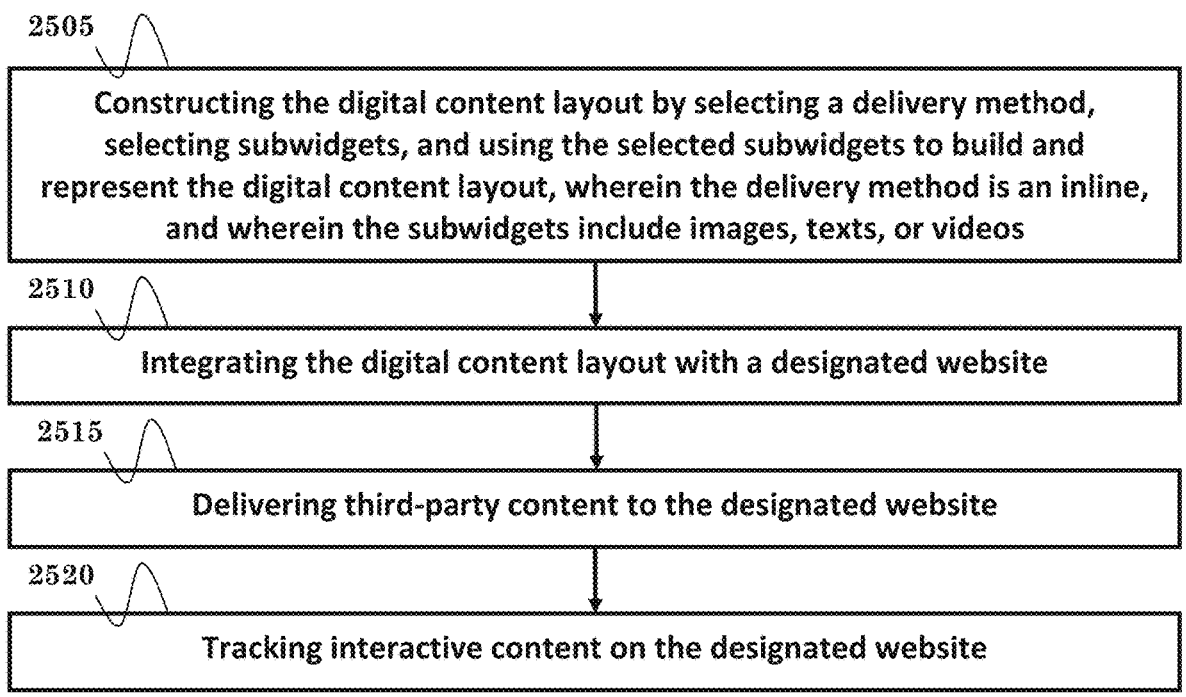
FIG. 25 is a flow chart in accordance with one embodiment of the invention.

FIG. 25 is a flow chart 2500 according to one exemplary embodiment. Step 2505 involves constructing a digital content layout by selecting a delivery method, selecting subwidgets, and using the selected subwidgets to build and represent the digital content layout, wherein the delivery method is an inline, and wherein the subwidgets include images, texts, or videos. Step 2510 involves integrating the digital content layout with a designated website. Step 2515 involves delivering third-party content to the designated website. Step 2520 involves tracking interactive content on the designated website.

While the method and apparatus for HTML construction using the widget paradigm are disclosed by reference to the various embodiments and examples detailed above, it should be understood that these embodiments are intended in an illustrative rather than limiting sense, as it is contemplated that modifications will readily occur to those skilled in the art which are intended to fall within the scope of the embodiments of the invention.

The invention claimed is:

1. A method for building and delivering a HTML (Hypertext Markup Language) construction representing a digital content layout, the method comprising:

constructing, via a computing device, the digital content layout, the computing device including at least one processing unit and a memory;

integrating natively the digital content layout with a designated website for fixed interactions with the digital content layout such that integration with the designated website does not dynamically alter the digital content layout, the integrating being over an electronic communication network that includes a plurality of computing devices, the computing devices communicating with each other via wired or wireless media, the integrating including:

associating the designated website with one or more files, the one or more files including (i) a map for third-party content for the designated website and (ii) one or more widgets, one or more subwidgets, or a combination thereof to build and represent the digital content layout according to the map on the designated website, the one or more files including a first file including the map for the third-party content published to the designated website, and the one or more files including a second file having the one or more widgets, the one or more subwidgets, or a combination thereof to build and represent the digital content layout according to the map on the designated website, wherein the designated website is associated with at least the first file and the second file;

determining one or more cascading style sheets (CSS) for rendering the third-party content natively within the designated website, the CSS being defined at a widget level, a subwidget level, a designated website level, or a combination thereof; and determining assets within the widgets, the subwidgets, the designated webpage, or a combination thereof for integrating into to the digital content layout; and delivering, via the communication network, the third-party content to the designated website along with the CSS and the assets such that the third-party content is natively integrated within the designated website based on the digital content layout.

2. The method of claim 1, wherein the third-party content is delivered inline directly in the designated website.

3. The method of claim 1, wherein the third-party content is delivered in a Call-To-Action (CTA) which is a button displayed inline which, when clicked triggers a window with content.

4. The method of claim 3, wherein the third-party content is delivered in an overlay where one or more Call-To-Actions (CTAs) are rendered on top of an existing element on the designated website.

5. The method of claim 1, wherein the subwidgets include asset subwidgets that are directly associated with media, data, or a URL (Uniform Resource Locator) to render content.

6. The method of claim 1, wherein the subwidgets include container subwidgets that are image containers, text or HTML containers, video players, or document viewers.

7. The method of claim 6, wherein one container subwidget is rendered within another subwidget to build an interactive layout.

8. The method of claim 1, further comprising tracking, via the network, interactive content within the third-party content on the designated website, wherein the interactive content is delivered via the digital content layout and originates from a third-party relative to a party that controls the designated website.

9. The method of claim 8, wherein the tracking captures events specific to content loads, clicks on content, navigation through content, and/or open and closing of calls-to-action or callouts.

10. The method of claim 8, wherein the tracking is based on an organizational structure and classification mechanisms.

11. A computing device for building and delivering a HTML (Hypertext Markup Language) construction representing digital content layout, the computing device comprising:

a control circuit;

a communication device having a communication connection for communicating with at least one other computing device over an electronic communication network;

a processor installed in the control circuit; and a memory installed in the control circuit and coupled to the processor;

wherein the processor is configured to execute a program code stored in the memory to:

construct the digital content layout;

integrate natively, over the electronic communication network, the digital content layout with a designated website for fixed interactions with the digital content layout such that integration with the designated website does not dynamically alter the digital content layout, the integration including:

associating the designated website with one or more files, the one or more files including (i) a map for third-party content for the designated website and (ii) one or more widgets, one or more subwidgets, or a combination thereof to build and represent the digital content layout according to the map on the designated website, the one or more files including a first file including the map for the third-party content published to the designated website, and the one or more files including a second file having the one or more widgets, the one or more subwidgets, or a combination thereof to build and represent the digital content layout according to the map on the designated website, wherein the designated website is associated with at least the first file and the second file;

determining one or more cascading style sheets (CSS) for rendering the third-party content natively within the designated website, the CSS being defined at a widget level, a subwidget level, a designated website level, or a combination thereof; and determining assets within the widgets, the subwidgets, the designated webpage, or a combination thereof for integrating into to the digital content layout; and deliver, via the electronic communication network, the third-party content to the designated website along with the CSS and the assets such that the third-party content is natively integrated within the designated website based on the digital content layout.

12. The computing device of claim 11, wherein the third-party content is delivered inline directly in the designated website.

13. The computing device of claim 11, wherein the third-party content is delivered in a Call-To-Action (CTA) which is a button displayed inline which, when clicked triggers a window with content.

14. The computing device of claim 13, wherein the third-party content is delivered in an overlay where one or more Call-To-Actions (CTAs) are rendered on top of an existing element on the designated website.

15. The computing device of claim 11, wherein the subwidgets include asset subwidgets that are directly associated with media, data, or a URL (Uniform Resource Locator) to render content.

16. The computing device of claim 11, wherein the subwidgets include container subwidgets that are image containers, text or HTML, containers, video players, or document viewers.

17. The computing device of claim 16, wherein one container subwidget is rendered within another subwidget to build an interactive layout.

\* \* \* \* \*